United States Patent [19]

Oudet

[11] Patent Number: 4,682,067
[45] Date of Patent: Jul. 21, 1987

[54] SYNCHRONOUS ELECTRIC MOTOR HAVING A DISC-SHAPED PERMANENT MAGNET ROTOR

[75] Inventor: Claude Oudet, Besancon, France
[73] Assignee: Portescap, Chaux-de-Fonds, Switzerland
[21] Appl. No.: 860,460
[22] Filed: May 7, 1986

[30] Foreign Application Priority Data

May 10, 1985 [CH] Switzerland .................. 1998/85

[51] Int. Cl.$^4$ .......................................... H02K 21/12
[52] U.S. Cl. .................................. 310/156; 310/162; 310/268
[58] Field of Search ............ 310/46, 49, 156, 162–165, 310/268

[56] References Cited

U.S. PATENT DOCUMENTS

| 3,700,943 | 10/1972 | Heintz | 310/268 |
| 3,700,944 | 10/1972 | Heintz | 310/268 |
| 4,330,727 | 5/1982 | Oudet | 310/268 |

Primary Examiner—Donovan F. Duggan
Attorney, Agent, or Firm—Cushman, Darby & Cushman

[57] ABSTRACT

The present invention relates to a synchronous electric motor of the type comprising at least one rotor part of substantially annular disc form, magnetized axially so as to present, on its opposite flat faces, a series of magnetic poles of alternate polarities, disposed regularly along an annular zone of each face, the rotor part being mounted on a rotary shaft, the motor also comprising an assembly of several elementary magnetic circuits which are insulated magnetically from one another, an annular electric energizing coil which is coupled with the said assembly of elementary magnetic circuits, each of said circuits providing an air-gap and the assembly of these air-gaps forming an annular region in which are disposed the magnetized zones of the rotor part, each of the elementary magnetic circuits having substantially flat C-configuration, being placed substantially radially with respect to said rotor shaft and having a central opening in which is placed said annular coil.

2 Claims, 3 Drawing Figures

SYNCHRONOUS ELECTRIC MOTOR HAVING A DISC-SHAPED PERMANENT MAGNET ROTOR

Such a motor is described, for example, in U.S. Pat. No. 4,330,727. The original conception of this motor is very well adapted to motors of relatively small size, corresponding to outputs of substantially less than 1 kilowatt. For larger sizes, it appeared that the structure described does not offer an optimal relationship between the torque produced and the weight of the motor, especially insofar as this weight depends on the mass of iron of the elementary magnetic circuits.

The invention has for its main object to provide a motor of the type as initially referred to, in which the mass of iron of the elementary magnetic circuits and, consequently, the weight of the motor and the losses in the iron are reduced to a minimum for a given torque of the motor.

To this effect, the motor according to the invention comprises an arrangement in which the transverse sections of each elementary magnetic circuit, considered along the path of the magnetic flux generated by said energizing coil, have a pratically constant area, at least in the portions of the circuit situated in proximity to the air-gap, in the portions situated at the height of the central opening, measured from the rotor shaft, and in the portion opposite to the air-gap with respect to the central opening.

In a particular embodiment of such a motor the said portions of the elementary magnetic circuits situated at the height of the central opening and those opposite the air-gap have a larger thickness, measured in the circumferential direction of the motor, than the portions situated close to the air-gap.

Other features and advantages of the invention will become apparent from the description to follow of a preferred embodiment and with reference to the accompanying drawing, wherein.

Figure 1:
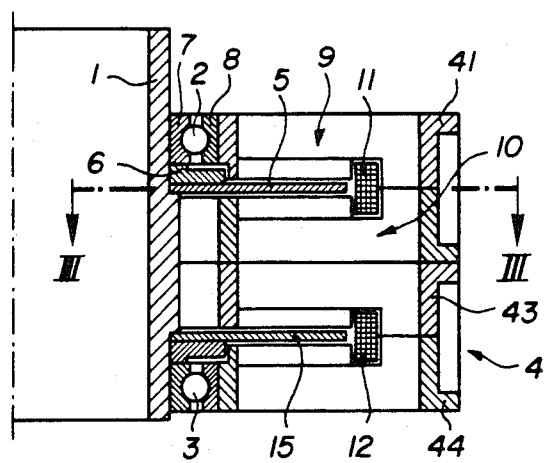
FIG. 1 is a view in axial section of a motor according to invention, having two stages.
Figure 2:
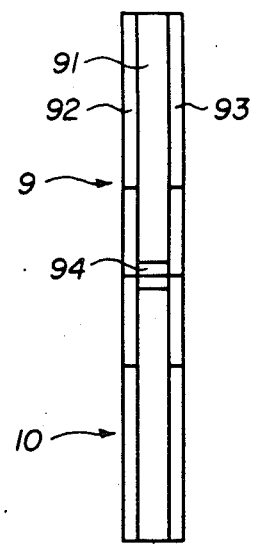
FIG. 2 is a view to a larger scale of an elementary magnetic circuit of the motor in FIG. 1, separate from the motor and seen, in the position of FIG. 1, from axis of the motor, and FIG. 3 a partial sectional view of the motor along the line III—III of FIG. 1.
Figure 3:
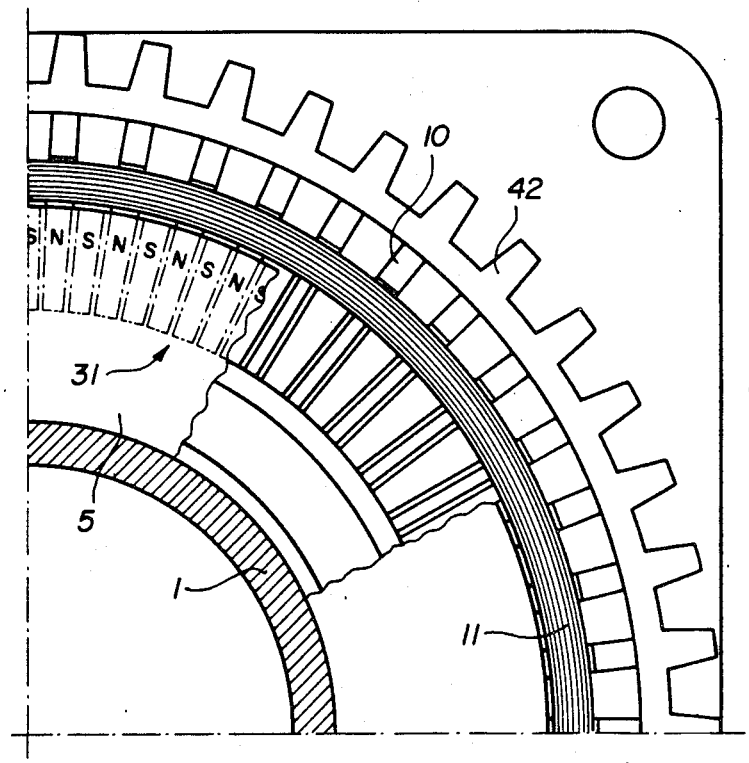

The motor shown in FIGS. 1 to 3 comprises a shaft 1, in the present case, a hollow shaft, of a diameter which is relatively large with respect to the radial dimensions of the motor. The shaft 1 is mounted to be rotatable, by means of ball bearings 2, 3, in a stator assembly 4 which is formed of two sub-assemblies which respectively comprise parts 41, 42 and 43, 44, made for example of aluminum or a synthetic plastics material.

A first annular disc 5, of a magnetisable material, such as samarium-cobalt, is mounted by means of an annular support member 6 on an inner race 7 of the ball bearing 2, this race being fast with the shaft 1. The outer race of the bearing 2 is mounted on the part 41 of the stator. This part 41 comprises recesses radially of the motor, and disposed therein are flat parts 9, made of a material having very good magnetic permeability, and forming the first parts of the elementary magnetic circuits of the sub-assembly 41, 42. A second series of such parts, indicated at 10, is placed in corresponding recesses of the part 42, and forms the second parts of these elementary magnetic circuits.

As shown in FIG. 1, two corresponding parts or members 9 and 10 are so disposed as to form a C-shaped circuit, having an air-gap into which passes the exterior part of the annular disc 5. An annular electric coil 11 is placed in the central openings of the elementary magnetic circuits of the sub-assembly 41, 42.

The annular disc 5 is magnetised in the axial direction, so as to cause magnetic poles of alternate polarities, i.e. N and S, to appear on each of its faces, these poles being distributed substantially regularly along an annular zone 31 which is indicated in FIG. 3. In this Figure, the poles N and S have been shown by chain-dotted lines. The dimensions of these poles are substantially equal to those of the polar surfaces formed by the ends of the C-shaped branches of the members 9 and 10, and the angular spacing of the median lines of the poles is substantially $\pi/N$ for a number of poles of 2N appearing in each of the annular zones on the two faces of the disc. The mean angular spacing of the axial median planes of the elementary magnetic circuits 9, 10 is $2\pi/N$. The effective spacing between two adjoining circuits may be slightly different from this mean value, in order to compensate for the influence of certain harmonics of the motor torque.

The motor which is described with reference to FIGS. 1 to 3 is a two-stage motor, the first stage comprising the magnetised disc 5 and the second, in quite similar manner, comprising a magnetised disc 15, this latter co-operating with the stator sub-assembly comprising the previously mentioned parts or members 43 and 44. The structure of the second stage is similar to that which has just been described with respect to the first. Each stage constitutes, for example, one phase structure of a two-phase motor.

FIG. 2 shows an elementary magnetic circuit, seen from the axis of the motor in the position of FIG. 1. Of generally flat form, this circuit presents different thicknesses along the path of the magnetic flux generated by the control coil, i.e. along the "C", so that the area of the transverse sections perpendicular to the path of the flux is practically constant. In the constructional form which is illustrated in the Figures, a circuit part, such as 9, is formed of three superposed sheet metal parts 91, 92 and 93, the central part 91 comprising one of the two pole parts forming the air-gap, designated by 94, and the lateral parts 92 and 93 forming a reinforcement of the thickness of this circuit part in the portion situated at the height of the central opening, and in the portion opposite to the air-gap, with respect to this central opening. The pole part, which preferably has a relatively considerable length in the radial direction of the motor, as shown in FIG. 1, thus has a smaller thickness than the reinforced parts closing the magnetic circuit, but the area of the corresponding rectangular transverse sections is substantially the same in the portions which are respectively situated at the height of the coil, measured from the shaft of the motor, and on the side opposite to the air-gap.

This arrangement permits the elementary magnetic circuit to be given such dimensions as to obtain, firstly, polar surfaces which are the longest possible in the radial direction of the motor and, secondly, a circuit of which the length of the magnetic flux path is the shortest possible for a given transverse section of the control coil, and of which the total weight is substantially reduced. The section of the magnetic circuit is understandably chosen in proportion with the magnetic field having to be generated by the coil 11, so as to avoid a saturation of the iron. The magnetic circuit as described therefore permits a maximum torque to be obtained for a minimum of losses in the iron and a minimal weight for the motor.

I claim:

1. A synchronous electric motor, comprising at least one rotor part of substantially annular disc form, magnetised axially so as to present, on its opposite flat faces, a series of magnetic poles of alternate polarities, disposed regularly along an annular zone of each face, the rotor part being mounted on a rotary shaft, the motor also comprising an assembly of several elementary magnetic circuits which are isolated magnetically from one another, an annular electric energizing coil which is coupled with the said assembly of elementary magnetic circuits, each of said circuits providing an air-gap and the assembly of these air-gaps forming an annular region in which are disposed the magnetised zones of the rotor part, each of the elementary magnetic circuits having a substantially flat C-configuration, being placed substantially radially with respect to said rotor shaft and having a central opening in which is placed said annular coil, the transverse sections of each elementary magnetic circuit, considered along the path of the magnetic flux generated by said energizing coil, having a practically constant area, at least in the portions of the circuit situated in proximity to the air-gap, in the portions situated at the height of the central opening, measured from the rotor shaft, and in the portion opposite to the air-gap with respect to the central opening.

2. A synchronous electric motor according to claim 1, wherein the said portions of the elementary magnetic circuits situated at the height of the central opening and those opposite the air-gap have a larger thickness, measured in the circumferential direction of the motor, than the portions situated close to the air-gap.

* * * * *